United States Patent [19]

Mak et al.

[11] Patent Number: 5,146,518
[45] Date of Patent: Sep. 8, 1992

[54] OPTICAL DIRECTIONAL COUPLER DEVICE AND A METHOD OF DRIVING SAME

[75] Inventors: Hon-Ming Mak; Hisaharu Yanagawa, both of Tokyo, Japan

[73] Assignee: The Furukawa Electric Co., Ltd., Tokyo, Japan

[21] Appl. No.: 674,567

[22] Filed: Mar. 25, 1991

[30] Foreign Application Priority Data

Mar. 30, 1990 [JP] Japan .................................. 2-83337
Nov. 19, 1990 [JP] Japan .................................. 2-313057

[51] Int. Cl.$^5$ ............................................... G02B 6/10
[52] U.S. Cl. ....................................... 385/41; 385/30; 385/14; 385/11
[58] Field of Search ............... 350/96.11, 96.12, 96.13, 350/96.14, 96.15, 320; 385/2, 11, 14, 9, 28, 30, 40, 41

[56] References Cited

U.S. PATENT DOCUMENTS

| | | | |
|---|---|---|---|
| 4,521,069 | 6/1985 | Ikeda ........................................ | 385/9 |
| 4,533,207 | 8/1985 | Alferness ................................ | 385/11 |
| 4,711,515 | 12/1987 | Alferness ................................ | 385/11 |
| 4,732,445 | 3/1988 | Sabatier et al. ........................ | 385/41 |
| 4,763,974 | 8/1988 | Thaniyavarn ............................ | 385/30 |
| 4,792,200 | 12/1988 | Amann et al. ............................ | 385/30 |
| 4,832,431 | 5/1989 | Nolting et al. ........................... | 385/2 |
| 4,893,352 | 1/1990 | Welford .................................. | 359/182 |
| 4,898,441 | 2/1990 | Shimizu .................................. | 385/11 |
| 4,917,449 | 4/1990 | Granestrand ............................ | 385/41 |
| 5,016,958 | 5/1991 | Booth .................................... | 385/16 |
| 5,022,731 | 6/1991 | Maerfeld et al. ........................ | 385/2 X |
| 5,066,086 | 11/1991 | Angenent et al. ...................... | 385/41 |

FOREIGN PATENT DOCUMENTS 2-170103 6/1990 Japan .................................. 385/11 X

OTHER PUBLICATIONS

Electron Information Communication Institute Paper (Denshi Joho Tsushin Gakkaishi), C-I, vol. J73-C-I., No. 9, pp. 559–566, Sep. 1990.
M. Okuno, N. Takato, M. Kawachi, A. Sugita, "Polarization-Beam Splitter Switch with Controlled Silica Waveguide Birefringence on Si Substrate", pp. 38–40, NTT Opto-electronics Laboratories, Japan.
M. Kobayashi, "An Optical Waveguide TE-TM Mode Splitter", pp. 300–302, Ibaraki Electrical Communication Laboratory, Nippon Telegraph and Telephone Public Corporation, Japan, Publication date Dec. 20, 1977.
Masamitsu Masuda, "An Optical TE-TM Mode Splitter Using LiNbO$_3$ Branching Waveguide", Mar. 19, 1990, pp. 20–22, (1980), Department of Electrical Engineering, McGill University, 3480, Canada.
M. Erman, "The Integration of Waveguides, Optical Devices and Detectors on InP for Implementation in Optical Diversity Coherent Receivers", (1989), P. Thijs, Philips Research Laboratories, The Netherlands.
J. Saulnier, "LiNbO$_3$ Beam-Splitter/Switch", 4 pages, Centre National d'Etudes des Telecommunications Laboratoire de Bagneux.

Primary Examiner—Brian Healy
Attorney, Agent, or Firm—Frishauf, Holtz, Goodman & Woodward

[57] ABSTRACT

There is provided an optical functional device having a coupling portion in which two optical waveguides formed of semiconductor material are evanescent-coupled to each other and arranged in parallel and comprising voltage application electrodes electrically connected to each other and disposed on an upstream side portion of one of the two optical waveguides and a downstream side portion of the other optical waveguide and current injection electrodes electrically connected to each other, disposed on an downstream side portion of the former one of the two optical waveguides and an upstream side portion of the other optical waveguide and electrically isolated from the voltage application electrodes; wherein N-stage (N is an integer larger than 2) electrodes of reversal $\Delta\beta$ structure are continuously disposed in the optical waveguide, first electrodes electrically connected to each other are disposed on the upsteam side portion of one of the two optical waveguides and the downstream side portion of the other optical waveguide between an Mth (M is an integer which satisfies the relation that $1\leq M\leq N-1$) stage electrode and an (M+1)th stage electrode and second electrodes which are electrically connected to each other but are electrically separated from the first electrodes are disposed on the downstream side portion of the former one of the two optical waveguides and the upsteam side portion of the other optical waveguide. The optical functional device can be operated as an optical splitter or polarization switch by combining the current injection operation and the voltage application operation with respect to the electrodes.

6 Claims, 16 Drawing Sheets

M-TH STAGE (M+1)TH STAGE

OPTICAL DIRECTIONAL COUPLER DEVICE AND A METHOD OF DRIVING SAME

BACKGROUND OF THE INVENTION

1. Field of the Invention

This invention relates to a directional coupler type optical functional device formed of semiconductor material and a method of driving the same, and more particularly to an optical functional device useful as an optical switch and an optical mode splitter and a method of driving the same.

2. Prior Art

Recently, various waveguide types of optical functional devices are proposed. However, most of the devices can be operated only for light which is polarized in a specified direction. For this reason, in the optical fiber communication which is now put into a practical stage, the above devices cannot be practically used unless light is previously subjected to the polarization control.

Under this circumstance, various studies on a polarization separator and a polarization-independent optical switch are actively made. Examples of the studies are explained with reference to the drawings below.

First, FIG. 1 is a schematic perspective view of a device disclosed in the article by Tadasu Sunada et al. in "ELECTRON INFORMATION COMMUNICATION INSTITUTE PAPER (DENSHI JOHO TSUSHIN GAKKAISHI)", C-I (vol J73-C-I. No. 9. pp559 to 566, September, 1990).

The device is constructed by forming a nonsymmetrical X-branch optical waveguide 2 by use of Ti-doped $SiO_2$ on an $LiNbO_3$ substrate 1, disposing three electrodes 3 in positions shown in the drawing and applying voltages between the respective electrodes as shown in the drawing, and the device may function as a polarization-independent optical switch and a TE mode/TM mode splitter.

FIG. 2 is a schematic plan view of a device proposed by J. Saulnier et al. in ECOC90-229 (1990) and the device is constructed by forming an optical waveguide by use of Ti-doped $SiO_2$ on an $LiNbO_3$ substrate, disposing electrodes (hatched portions) as shown in the drawing and applying voltages to the respective electrodes as shown in the drawing.

A device shown in FIG. 3 and FIG. 4 which is a cross sectional view taken along the line IV—IV of FIG. 3 and proposed by M. Okuno et al. in "Photonic Switching" pp38 to 40, 1990 is constructed by embedding cores 5 formed of $SiO_2$ into a clad 6 on an Si substrate 4 to form a directional coupler type optical waveguide 7, depositing a thin Cr film to form a current injection electrode 8 in position of one of the waveguides shown in the drawing, and forming an a-Si thin film 9 in position of the other waveguide shown in the drawing.

As shown in FIG. 5, an optical mode splitter proposed by M. Kobayashi et al. in Appl. Phys. Lett., vol 32, pp300 to 302 (1978) is known.

The above optical mode splitter has an optical waveguide which is formed of glass-series material of $SiO_2$-$Ta_2O_5$, an waveguide layer 11 and an interlaid layer 12 which are sequentially disposed as a 2-dimensional waveguide on a substrate 10, and a thin waveguide layer 13 which is formed with a preset inclination angle on the interlaid layer 12, and functions to receive incident light in a Z direction in the drawing and separates the same into the TE mode and TM mode. That is, when light is made incident on the waveguide layer 11 in the Z direction, the mode selection condition established by the inclination of the thin-film waveguide layer 13 is satisfied, a TE mode component 14a of the incident light is coupled with the thin-film waveguide layer 13, and a TM mode component 14b thereof travels straight without being coupled with the thin-film waveguide layer 13. As a result, the TE mode 14a and the TM mode 14b can be separated.

Since all of the portions of each of the above-described four types of devices are not formed of semiconductor material, it is impossible to apply the above devices to an optical integrated circuit device of polarized diversity light reception system manufactured by integrating an active element such as an LD, LED or PD having most portions formed of semiconductor material in a monolithic form. Further, the optical mode splitter shown in FIG. 5 is not suitable for integration and it is difficult to deposit the waveguide layer, interlaid layer and thin-film waveguide layer at a high precision, and as a result, it becomes difficult to properly attain the mode coupling condition in the vertical direction (thickness direction) of the device.

Furthermore, the above devices are large in size, significantly low in the characteristics thereof in response to temperature changes, and are slow in the response speed, and because of high power consumption, they are liable to suffer optical damage and DC drift. In order to solve the above problems and make it possible to integrate the active elements in a monolithic form, all the portion of the device may be formed of semiconductor material.

Before introducing optical functional devices having entire portions formed by semiconductor material, conventional optical splitter devices will be explained firstly.

FIG. 6 and FIG. 7 which is a cross sectional view taken along the line VII—VII of FIG. 6 show an optical mode splitter proposed by M. Masuda and G. L. Yip in Appl. Phys. Lett., vol 37, pp 20 to 22 (1980).

In the optical mode splitter, a Y-branch multiple mode waveguide is first formed by use of $LiNbO_3$-series material (FIG. 6). Then, as shown in FIG. 7, a buffer layer 16 such as an $Al_2O_3$ layer is laid in part of a main path 15 and one of the waveguides (15b in the drawing) so that the equivalent refractive indices thereof can be made different from each other and one set of electrodes 17a and 17b are disposed so that a voltage can be applied between the electrodes as shown in FIG. 7.

Assume now that the equivalent refractive index of the branch waveguide 15a is $n_1$, the equivalent refractive index of the branch waveguide 15b is $n_2$, and $n_1 < n_2$.

In this state, light in which both of the TE mode and TM mode are present is made incident on the main path 15. Since the equivalent refractive index of the branch waveguide 15b is larger than that of the branch waveguide 15a, the incident light is confined in the branch waveguide 15b and emitted therefrom.

However, if a voltage is applied between the electrodes 17a and 17b, the equivalent refractive index of the branch waveguide 15b is lowered only for the TE mode by the electro-optical effect. Therefore, if application of the voltage causes the amount of reduction in the refractive index to become larger than $|n_1 - n_2|$, and when a higher voltage is applied, the TE mode component of the light incident on the main path 15 is confined in the branch waveguide 15a whose equivalent refractive index is made larger than that of the branch waveguide 15b and emitted therefrom. Since the equivalent refractive indices of the branch waveguides 15a and 15b are kept unchanged for the TM mode component of the incident light, the TM mode light travels in the branch waveguide 15b and is emitted therefrom. Thus, the incident light can be split into the TE mode and TM mode by application of the voltage between the electrodes 17a and 17b.

However, in the case of the above optical mode splitter, the integration is difficult, the structure thereof is improper for mode communication, the mode splitting efficiency is low, and a high extinction ratio cannot be attained.

FIG. 8 is a schematic perspective view of an optical mode splitter proposed by M. Erman et al. in 15th ECOC.ThB201 (1989).

In the above optical mode splitter, a directional coupler type optical waveguide is constituted by two waveguides 18a and 18b arranged in parallel using semiconductor material and the upper surface of one of the waveguides (18b in the drawing) is covered with a metal layer 19.

With the above construction, the equivalent refractive indices for the TE mode and TM mode are made different between the waveguides 18a and 18b.

Therefore, when light in which both of the TE mode and TM mode are present is made incident on the waveguide 18a, the TE mode light is coupled with the waveguide 18b which is covered with the metal layer 19 and the TE mode light is guided in the waveguide 18b and emitted therefrom. However, since the TM mode light is not coupled with the waveguide 18b, it is emitted from the waveguide 18a as it is. That is, the TE mode and TM mode are separated from each other.

However, since the above optical mode splitter does not function unless the length of the coupling portion is equal to the complete coupling length for the TE mode, it becomes necessary to form the coupling portion at an extremely high precision in order to attain the function. However, it is difficult to form the coupling portion with a required high precision by use of the present photolithographic technology and etching technology and actually manufactured devices cannot meet the requirement of high dimensional precision so that the mode splitting efficiency will become low and a high extinction ratio cannot be attained.

Further, a device with the construction shown in FIG. 9 and FIG. 10 which is a cross sectional view taken along the line X—X of FIG. 9 is disclosed in Published Unexamined Japanese Patent Application No. 2-170103.

The device includes a diffraction grating 22 disposed in an orthogonal section 21 of emission side optical waveguides 20a and 20b which cross at right angles and part of the upper surface of the emission waveguide 20a which is one of the emission side optical waveguides is covered with a metal layer 23, and it functions as an optical branching filter for separating the TE mode and TM mode from each other.

In the case of the above device, the extinction ratio thereof may be approximately several tens dB although not clearly determined. Further, the mode separation depends on the uniformity of the depth of a groove of the diffraction grating 22 introduced into the orthogonal section 21. In view of the manufacturing process, since it is extremely difficult to control realization of the uniformity of the depth and the emission side optical waveguides 20a and 20b of both modes are crossed at right angles, inconvenience may occur when it is integrated together with another element and connected to the same.

Next, a conventional optical switch which is of directional coupler type and is formed of semiconductor material is explained.

FIG. 11 is a schematic plan view of an optical switch of uniform $\Delta\beta$ structure. In the case of the above optical switch, two optical waveguides 24 and 25 formed of semiconductor material are arranged on a semiconductor substrate (not shown) and an optical waveguide section 24a and an optical waveguide section 24b are arranged closely to and in parallel with each other so as to be evanescent-coupled so that a coupling portion can be formed in an area A surrounded by broken lines in the drawing.

An electrode 26 is formed on one of the optical waveguide sections (24a in the drawing) and voltage application and current injection with respect to the optical waveguide section 24a can be effected by use of the electrode 26.

In the case of the optical switch, for example, if light is made incident on an upstream side end portion 25b of the optical waveguide 25 and the electrode 26 is set in the non-driven state, the light is coupled with the optical waveguide section 24a in the coupling portion A and emitted from a downstream side end portion 24c of the optical waveguide 24. That is, the light incident on the upstream side end portion 25b is emitted from the downstream side end portion 24c of the optical waveguide 24 and is not emitted from the downstream side end portion 25c of the optical waveguide 25.

However, for example, when current is injected via the electrode 26 to lower the equivalent refractive index of the optical waveguide section 24a, light incident on the upstream side end portion 25b of the optical waveguide 25 passes in the optical waveguide section 25a and is emitted only from the optical waveguide section 25a without being coupled with the optical waveguide section 24a. That is, by current injection via the electrode 26, the light emission side is changed from the downstream side end portion 24c to the downstream side end portion 25c, thus attaining a switching function.

However, in order to operate the uniform $\Delta\beta$ structure type optical switch, it is necessary to previously adjust the emission ratio of the downstream side end portions 24c and 25c of the two optical waveguides 24 and 25 to 1:0 (or 0:1). This can be attained by precisely controlling the lengths of the optical waveguide sections 24a and 25a and a distance between the optical waveguide sections in the coupling portion A. However, it is extremely difficult to set the length of the coupling portion A at a high precision with the present level of photolithographic technology. For this reason, in the case of the above uniform $\Delta\beta$ structure type optical switch, crosstalk will inevitably occur in the process of optical coupling.

An reversal $\Delta\beta$ structure type optical switch shown by a schematic plan view of FIG. 12 is proposed to solve the above-described problem of the uniform $\Delta\beta$ structure type optical switch.

In the coupling portion A of the optical switch, electrodes 26a and 26b are disposed to be symmetrical with respect to a point on a downstream side portion 24d of an optical waveguide section 24a and the upstream side portion 25d of an optical waveguide section 25a and the electrodes 26a and 26b are connected to each other via a connecting portion 26c. With this construction, the electrode 26a may be disposed on an upstream side portion 24e of the optical waveguide section 24a and the electrode 26b may be disposed on a downstream side 25e of the optical waveguide section 25a.

Unlike the uniform $\Delta\beta$ structure type optical switch, in the optical switch of the above construction, the coupling state will not be restricted by the initial condition of the coupling portion A.

First, when the electrodes 26a and 26b are set into the non-driven state and light is made incident on the upstream side end portion 25b of the optical waveguide 25, for example, then the light is coupled with the optical waveguide section 24a and confined therein in the coupling portion A and is emitted from the downstream side end portion 24c.

Next, when voltage application or current injection is effected with respect to the electrode 26a (26b), a cross state is established between the optical waveguide sections 24a and 25a at a certain voltage or current, and if the voltage or current is further increased, a switching state appears after a thorough state has appeared.

That is, $\Delta\beta$ in the entire portion of the coupling portion A is reversed by voltage application or current injection by means of the electrode 26a (26b) and the emission end for light incident on the upstream side end portion 25b is changed from the downstream side end portion 24c to the downstream side end portion 25c.

In the case of the reversal $\Delta\beta$ structure type optical switch, the coupling state can be reliably controlled irrespective of the initial condition of the coupling portion A. However, in general, the value of the voltage or current required for establishing the through state becomes large although the value of the voltage or current required for establishing the cross state is not so large.

Therefore, the pn junction formed in the optical waveguide may be damaged by heat generation caused by large power consumption in the semiconductor material constituting the optical waveguide, thereby reducing the service life of the element.

SUMMARY OF THE INVENTION

An object of this invention is to provide a directional coupler type optical functional device the entire portion of which is formed of semiconductor material so as to be integrated with another active element formed of semiconductor material in a monolithic form and a method of driving the same.

Another object of this invention is to provide an optical functional device in which application voltage and injection current set at the time of driving can be made smaller than those in the conventional case so as to prevent the pn junction in the optical waveguide from being broken down so that the service life can be improved and the reliability can be enhanced and a method of driving the same.

Another object of this invention is to provide an optical functional device which is free from optical damage and DC drift and in which the characteristic can be prevented from being deteriorated by variation in temperature and a method of driving the same.

Still another object of this invention is to provide an optical functional device functioning as an optical switch or an optical mode splitter of high extinction ratio and a method of driving the same.

Another object of this invention is to provide an optical functional device which is not restricted by limitation of the optical coupling coefficient due to the length of the coupling portion at the time of creation of the optical waveguide so that the manufacturing process can be made relatively simple and the mass production and cost reduction can be easily attained.

In order to attain the above objects, this invention provides a directional coupler type optical functional device having first and second optical waveguides in which pn junction structures are formed by laminating semiconductor material and a coupling portion in which the two optical waveguides are evanescent-coupled to each other and arranged in parallel, comprising voltage application electrodes formed on an upstream side portion of the first optical waveguide and a downstream side portion of the second optical waveguide in the coupling portion and electrically connected to each other; and current injection electrodes formed on a downstream side portion of the first optical waveguide and an upstream side portion of the second optical waveguide in the coupling portion, electrically connected to each other and electrically isolated from the voltage application electrodes.

Further, in this invention, a method of driving the above optical functional device is provided.

In a first aspect of the method, there is provided a method comprising the steps of causing light in which TE mode light and TM mode light are present to enter one of the first and second optical waveguides;

injecting current of a predetermined value into the optical waveguides via the current injection electrodes to establish a cross state between the optical waveguides of the coupling portion; and applying a preset voltage to the voltage application electrodes while maintaining the cross state so as to establish a through state only for the TE mode light between the optical waveguides of the coupling portion, thereby splitting the incident light into the TE mode light and the TM mode light.

The above driving method is a method for operating the optical functional device as an optical mode splitter.

In a second aspect of the driving method, there is provided a method comprising the steps of causing TE mode light to enter one of the first and second optical waveguides;

applying a preset voltage to the voltage application electrodes to establish a cross state between the optical waveguides of the coupling portion; and injecting current of a predetermined value into the optical waveguides via the current injection electrodes while maintaining the cross state so as to establish a through state between the optical waveguides of the coupling portion, thereby changing the optical path for the incident TE mode light.

The above driving method is a method for operating the optical functional device as a polarization optical switch.

In another aspect of this invention, there is provided an optical functional device having first and second optical waveguides in which pn junction structures are formed by laminating semiconductor material and a coupling portion in which the two optical waveguides are evanescent-coupled to each other over a complete coupling length $L_0$ and arranged in parallel and which has a length of L, comprising N-stage (N is an integer larger than 2) paired electrodes of reversal $\Delta\beta$ structure type continuously disposed in a light propagating direction in the optical waveguide on each of the optical waveguides in the coupling portion, wherein an Mth (M is an integer which satisfies the relation that $1 \leq M \leq N-1$) stage electrode formed on the first optical waveguide and an (M+1)th stage electrode formed on the second optical waveguide are electrically connected to form a first electrode and an Mth stage electrode formed on the second optical waveguide and an (M+1)th stage electrode formed on the first optical waveguide are electrically connected to form a second electrode, and the first and second electrodes are electrically disconnected.

Further, in this invention, a method of driving the above optical functional device is provided.

In a first aspect of the driving method, there is provided a method comprising the steps of causing light in which TE mode light and TM mode light are present to enter one of the first and second optical waveguides of the optical functional device in which $L/L_0$ is set to a proper value;

injecting current of a preset value from the first electrode to the optical waveguide so as to establish a cross state or through state between the optical waveguides of the coupling portion; and applying voltage of a preset value to the second electrode while maintaining the cross state or through state so as to set the cross state or through state only for the TE mode between the optical waveguides of the coupling portion, thereby splitting the incident light into the TE mode light and TM mode light.

The above driving method is a method for operating the optical functional device as an optical mode splitter.

In a second aspect of the driving method, there is provided a method comprising the steps of causing light in which TE mode light and TM mode light are present to enter one of the first and second optical waveguides of the optical functional device in which $L/L_0$ is set to a proper value;

injecting current of a first preset value from the first electrode to the optical waveguide so as to establish a cross state or through state between the optical waveguides of the coupling portion;

applying voltage of a preset value to the second electrode while maintaining the cross state or through state so as to set the cross state or through state only for the TE mode between the optical waveguides of the coupling portion, thereby splitting the incident light into the TE mode light and TM mode light;

injecting current of a second preset value which is larger than the first preset value from the first electrode to the optical waveguide so as to establish the cross state or through state between the optical waveguides of the coupling portion; and applying voltage of a preset value to the second electrode while maintaining the cross state or through state so as to set the through state or cross state only for the TE mode between the optical waveguides of the coupling portion, thereby changing the paths of the split TE mode light and TM mode light.

The above driving method is a method for splitting the incident light into the TE mode and TM mode, causing the respective lights to be emitted from the different optical waveguides and changing the optical path, thereby operating the optical functional device as an optical switch.

DETAILED DESCRIPTION OF THE PREFERRED EMBODIMENTS

Figure 1:
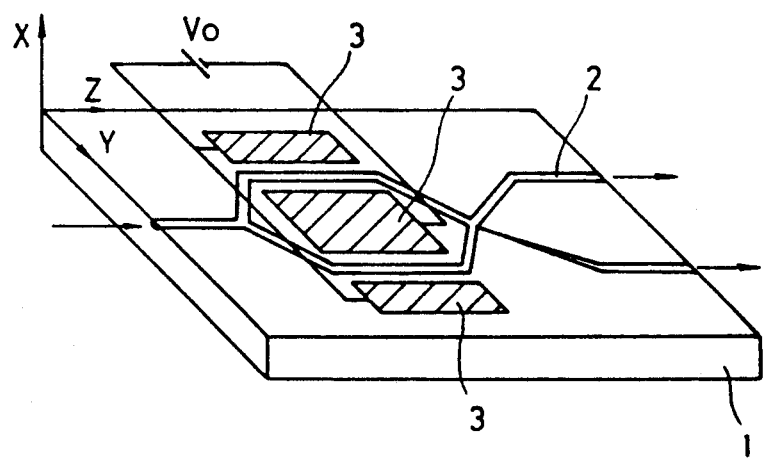
FIG. 1 is a schematic perspective view of a conventional optical switch.
Figure 2:
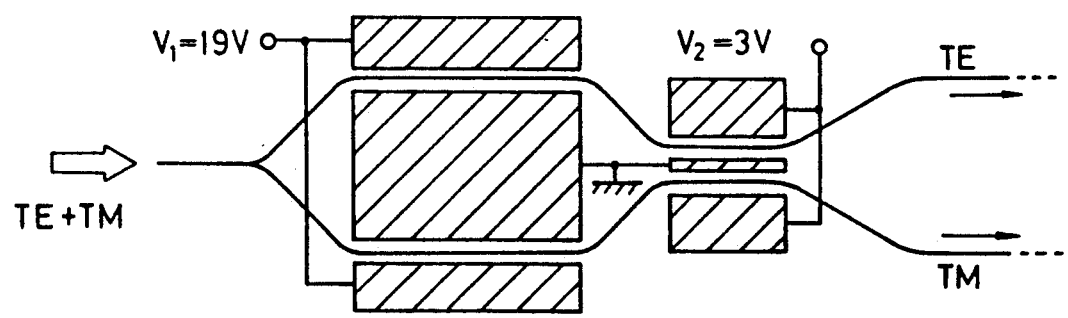
FIG. 2 is a schematic plan view of another conventional optical switch.
Figure 3:
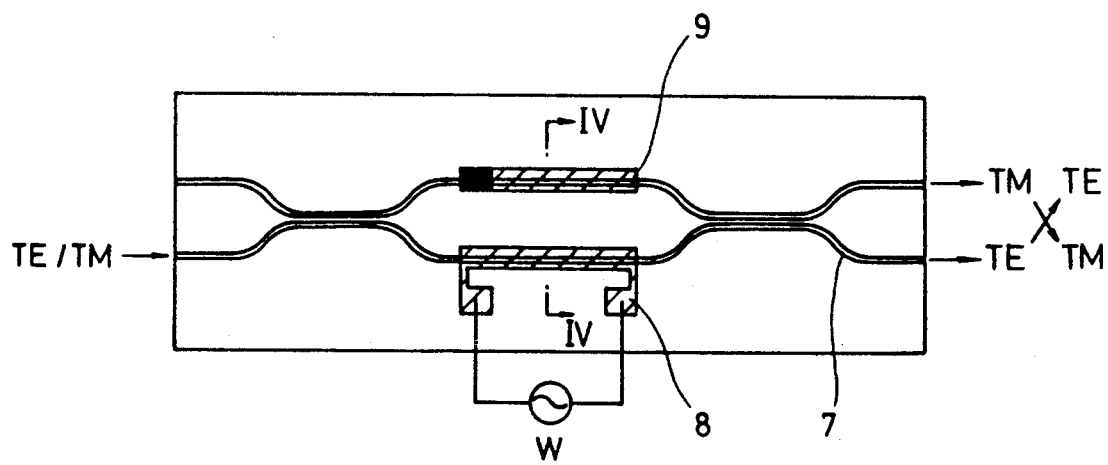
FIG. 3 is a schematic plan view of still another conventional optical switch.
Figure 4:
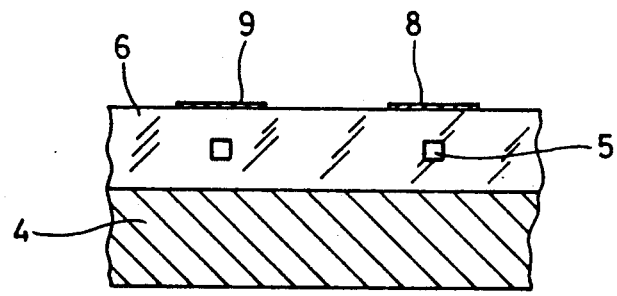
FIG. 4 is a cross sectional view taken along the line IV—IV of FIG. 3.
Figure 5:
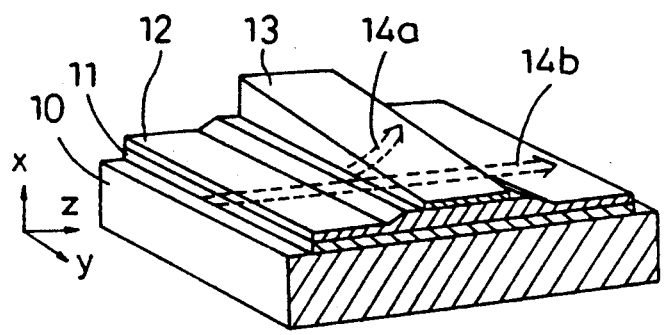
FIG. 5 is a schematic perspective view of a conventional optical mode splitter.
Figure 6:
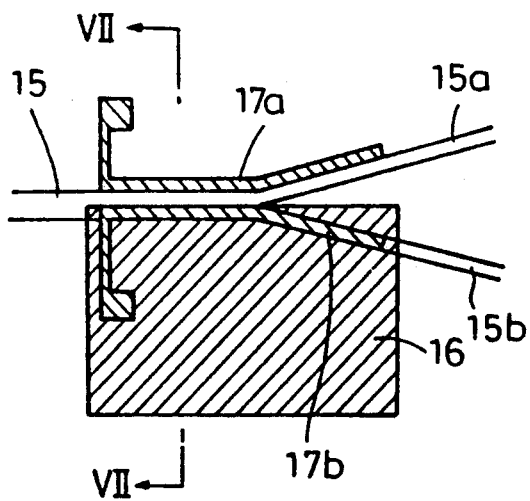
FIG. 6 is a schematic plan view of another conventional optical mode splitter.
Figure 7:
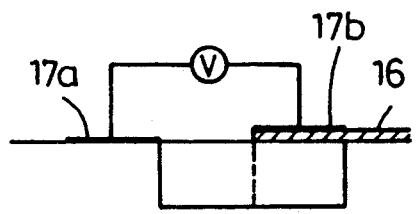
FIG. 7 is a cross sectional view taken along the line VII—VII of FIG. 6.
Figure 8:
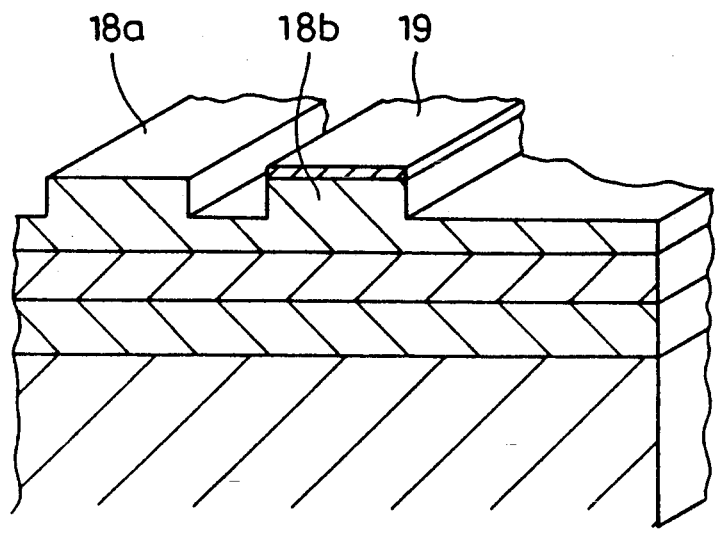
FIG. 8 is a schematic perspective view of still another conventional optical mode splitter.
Figure 9:
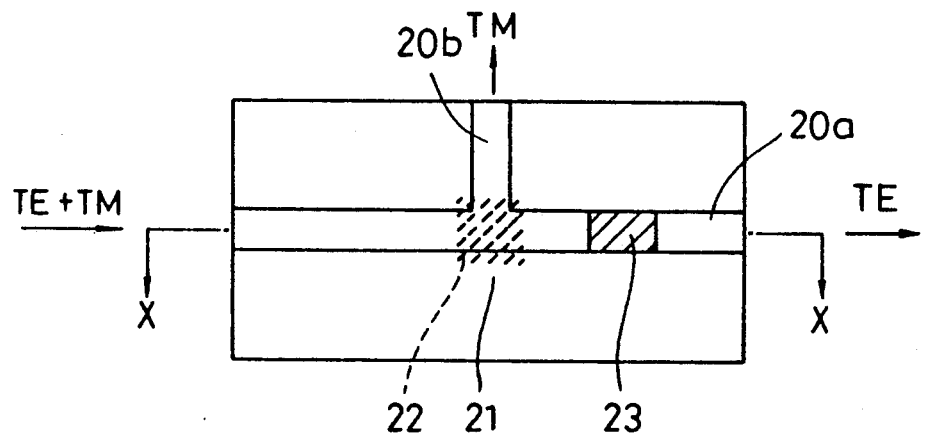
FIG. 9 is a schematic plan view of another conventional optical mode splitter.
Figure 10:
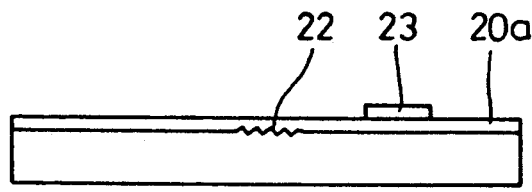
FIG. 10 is a cross sectional view taken along the line X—X of FIG. 9.
Figure 11:
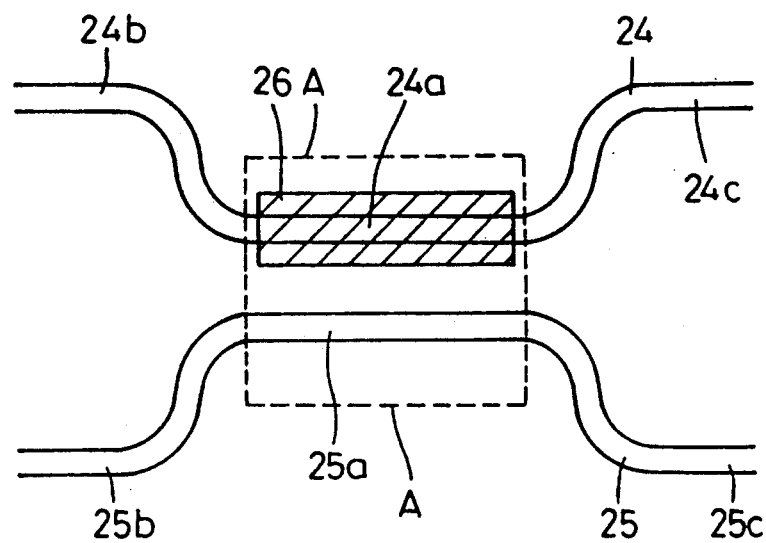
FIG. 11 is a schematic plan view of an optical switch of uniform $\Delta\beta$ structure type formed of semiconductor.

An optical functional device of this invention is of directional coupler type obtained by laminating semiconductor material and a pn junction structure is formed in the optical waveguide thereof.

When current of a preset value is injected into the optical waveguide with the pn junction structure, the plasma effect or band filling effect occurs in the optical waveguide into which the current is injected and the refractive index thereof is reduced. The above effects may appear for both of the TE mode and TM mode and are independent from the polarization.

When voltage of a preset value is applied to the optical waveguide with the above pn junction structure, the electro-optical effect occurs in the optical waveguide to which the voltage is applied and the refractive index thereof becomes large. The above effect appears only for the TE mode and is polarization-dependent.

The optical functional device of this invention is driven by use of the above effect.

First, the optical functional device of a first aspect is explained with reference to FIG. 13.

In the drawing, optical waveguides 27 and 28 having cross sections described later are arranged close to and in parallel with each other in a coupling portion A so that optical waveguide sections 29 and 30 can be evanescent-coupled with each other. In this case, the optical waveguide section 29 is referred to as a first optical waveguide and the optical waveguide section 30 is referred to as a second optical waveguide.

Current injection electrodes 31a and 31b are respectively disposed on an upstream side portion 29a of the first optical waveguide 29 and a downstream side portion 30a of the second optical waveguide 30 so as to be electrically connected via a connecting portion 31c, and it is so designed that current can be injected from the electrodes 31a and 31b into the upstream side portion 29a of the first optical waveguide 29 and the downstream side portion 30a of the second optical waveguide 30.

Voltage application electrodes 32a and 32b are disposed on a downstream side portion 29b of the first optical waveguide 29 and an upstream side portion 30b of the second optical waveguide 30 so as to be electrically connected via a connecting portion 32c but electrically separated from the current injection electrodes 31a and 31b, and it is so designed that voltage can be applied to the downstream side portion 29b of the first optical waveguide 29 and the upstream side portion 30b of the second optical waveguide 30 by means of the electrodes 32a and 32b.

In this device, it is also possible to use the electrodes 31a and 31b for voltage application and the electrodes 32a and 32b for current injection.

Figure 13:
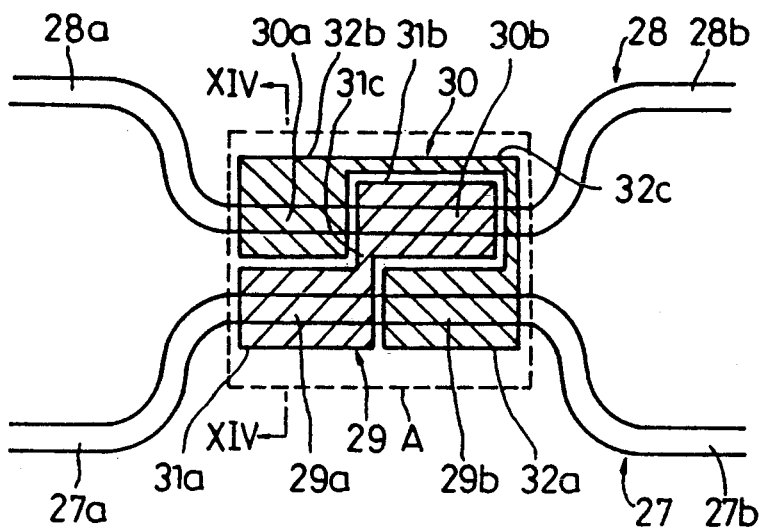
FIG. 13 is a plan view showing an optical functional device according to this invention.
Figure 14:
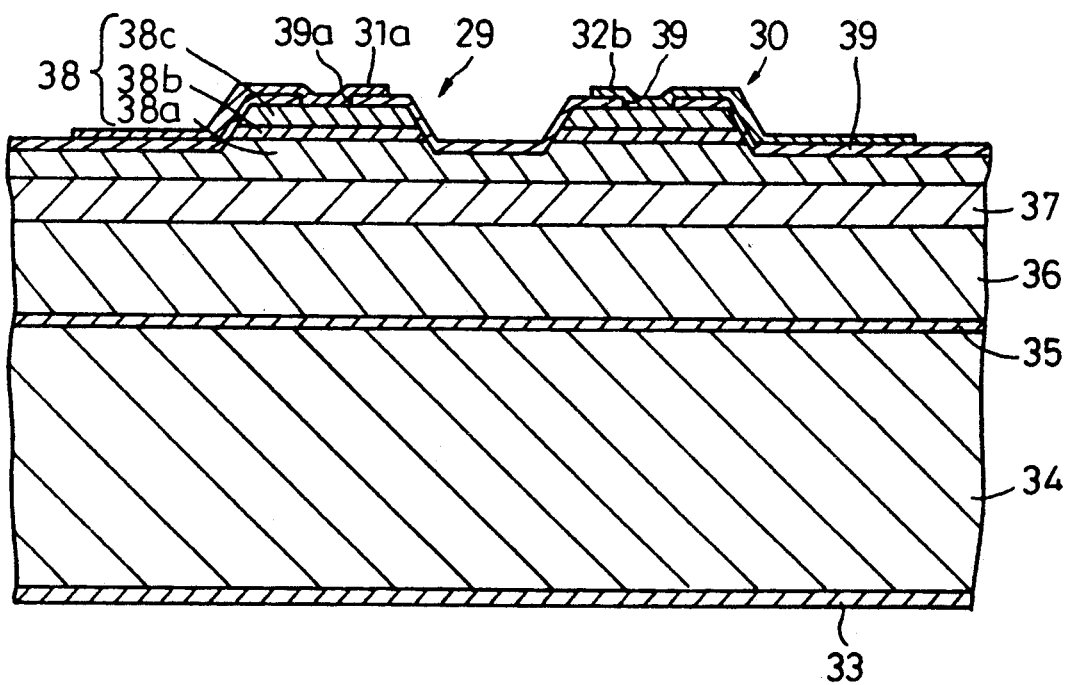
FIG. 14 is a cross sectional view taken along the line XIV—XIV of FIG. 13.

The cross sectional structure of the optical functional device is shown in FIG. 14 which is a cross sectional view taken along the line XIV—XIV of FIG. 13.

That is, an n+GaAs substrate 34 and an n+GaAs buffer layer 35 are laminated on a lower electrode 33 formed of AuGeNi/Au, for example. A lower clad layer 36 of n+AlGaAs and a core layer 37 of n−GaAs are sequentially formed on the buffer layer 35, and two upper clad layers 38 are disposed in parallel with each other in a ridge form on the core layer 37. The upper clad layer 38 includes a clad layer 38a of n−AlGaAs, a clad layer 38b of p−AlGaAs and a cap layer 38c of p+GaAs formed on the clad layer 38b, and the interface between the clad layers 38a and 38b constitutes a pn junction structure.

The upper surface of the upper clad layer 38 is covered with an insulation film 39 such as an SiO$_2$ film, and a slit-form window 39a extending in a lengthwise direction of the optical waveguide is formed in the upper portion of each of the ridge portions thereof and then Ti/Pt/Au is deposited on portions including the windows to form upper electrodes 31a and 32b. Thus, the entire portion constitutes the optical waveguide sections 29 and 30 in the coupling portion A.

In a case where semiconductor material is laminated in the above-described manner to form the optical waveguide sections 29 and 30, the optical waveguide is arranged to be in parallel with a direction <01$\bar{1}$> or <0$\bar{1}$1> on the crystal plane (100) of semiconductor of each layer. If the optical waveguide is not arranged in this manner, the resulting waveguide cannot exhibit required plasma effect and band filling effect caused by current injection, and at the same time a required electrooptical effect caused by voltage application.

Next, the driving method for operating the optical functional device as an optical mode splitter is explained.

First, assume now that light in which TE mode light and TM mode light are present is made incident on the upstream side end portion 27a of the optical waveguide 27, for example.

When a forward current of a preset value is injected from the electrodes 31a and 31b, a polarization-independent cross state is established between the upstream side portion 29a and downstream side portion 30b of the optical waveguides which lie under the electrodes.

Therefore, the light which has entered the upstream side end portion 27a of the optical waveguide 27 is emitted only from the downstream side end portion 28b of the optical waveguide 28 irrespective of the TE mode or TM mode.

When an inverted voltage of a preset value is applied by means of the electrodes 32a and 32b while the above state is maintained, an electro-optical effect occurs in the downstream side portion 29b and the upstream side portion 30a of the optical waveguides which lie directly under the above electrodes, and the refractive index of the portions is raised only for the TE mode to establish a through state for TE mode light. As a result, TE mode light is emitted from the downstream side end portion 27b of the optical waveguide 27.

As described above, TE mode light is emitted from the downstream side end portion 27b of the optical waveguide 27 and TM mode light is emitted from the downstream side end portion 28b of the optical waveguide 28, and thus the mode splitting operation can be effected.

Figure 15:
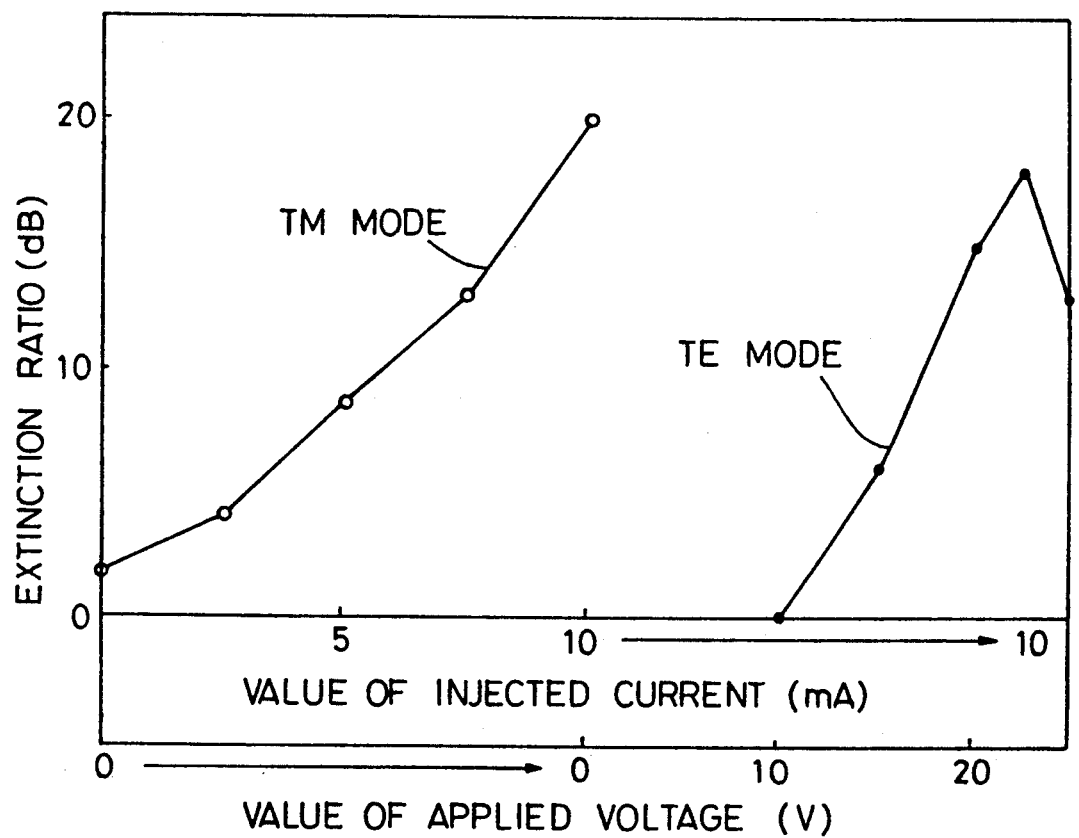
FIG. 15 is a graph showing the operation characteristic of the optical functional device of this invention functioning as an optical mode splitter.

An example of the above state is shown in FIG. 15. That is, in the optical functional device of this invention, the injection current for the cross state is set to 10 mA and in this case the extinction ratio of the TM mode light is 20 dB, and the application voltage for the through state is 23 V and in this case the extinction ratio of the TE mode light is 18 dB.

Next, the driving method of operating the optical functional device as an optical switch is explained.

Light of only the TE mode is made incident on the upstream side end portion 27a of the optical waveguide 27.

An inverted voltage of a preset value is applied by means of the electrodes 32a and 32b. Since a cross state is established between the downstream side portion 29b and upstream side portion 30a of the optical waveguides which lie directly under the electrodes by the electrooptical effect, the incident light (TE mode) is emitted only from the downstream side end portion 28b of the optical waveguide 28.

When a forward current of a preset value is injected from the electrodes 31a and 31b while the above state is maintained, the plasma effect and band filling effect occur in the upstream side portion 29a and downstream side portion 30b of the optical waveguides which lie directly under the electrodes so that the first optical waveguide 29 may be set into the through state so as to permit the TE mode light to be emitted from the downstream side end portion 27b.

Then, when the current supply from the electrodes 31a and 31b is interrupted, the cross state is recovered so as to permit the TE mode light to be emitted from the downstream side end portion 28b of the optical waveguide 28.

That is, the switching operation for the TE mode can be effected by effecting or interrupting current supply to the electrodes 31a and 31b while voltage application via the electrodes 32a and 32b is maintained and vice versa.

Figure 16:
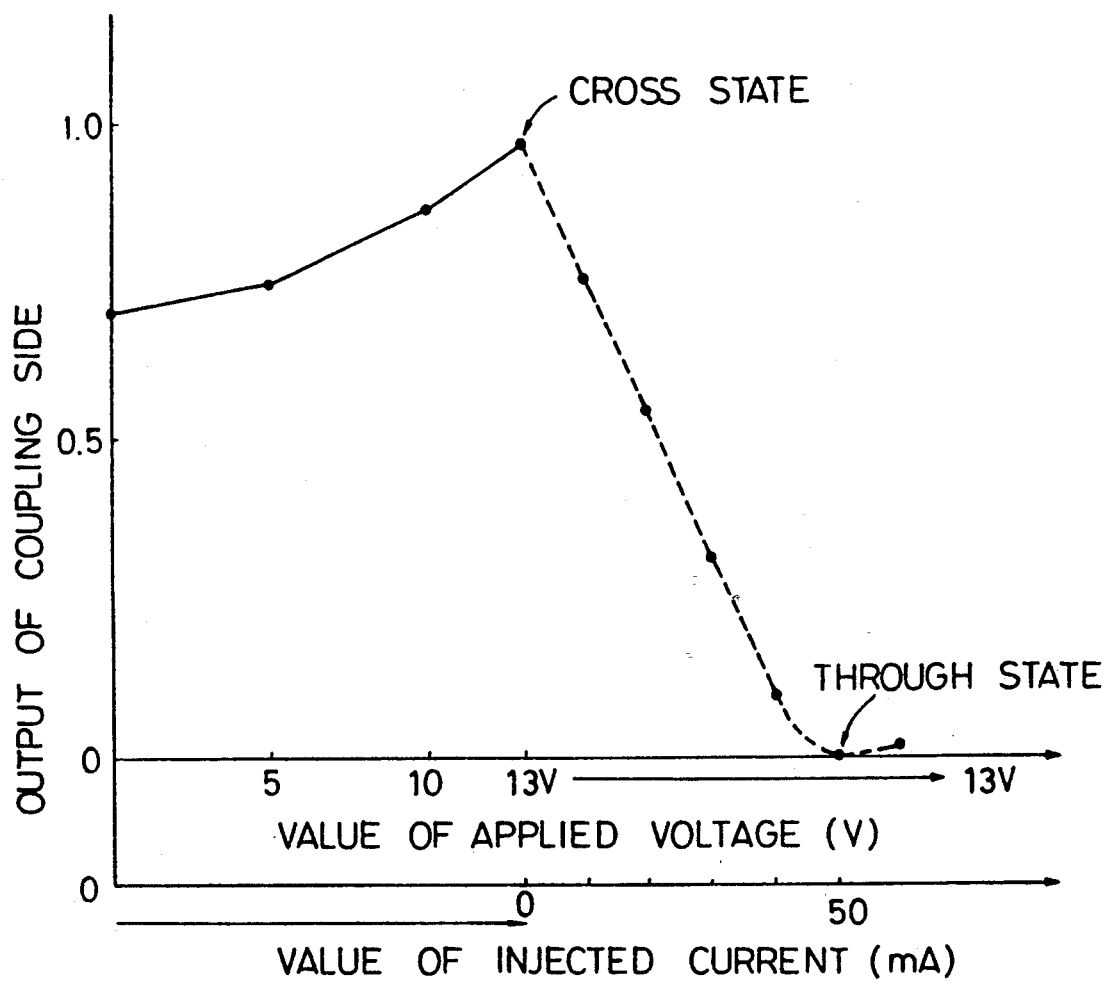
FIG. 16 is a graph showing the operation characteristic of the optical functional device of this invention functioning as an optical switch.

An example of this state is shown in FIG. 16. In FIG. 16, a solid line indicates an output on the coupling side caused by voltage application and broken lines indicate an output on the coupling side caused by current injection. FIG. 16 is a switching characteristic diagram obtained when the n−AlGaAs clad layer 38 is formed with a thickness of 0.8 μm in the optical functional device having the cross sectional structure shown in FIG. 14.

Figure 12:
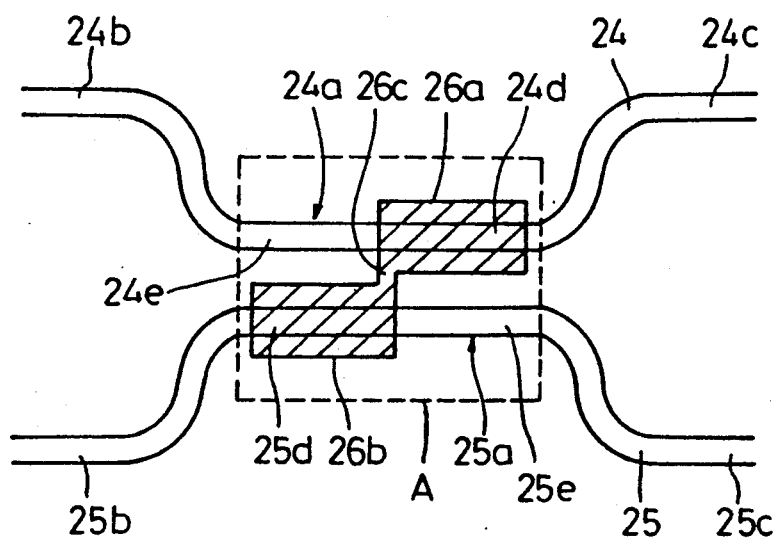
FIG. 12 is a schematic plan view of an optical switch of reversal $\Delta\beta$ structure type formed of semiconductor.

In this case, a cross state is established when the application voltage has reached 15 V, and then a through state is established when the injection current is set to approx. 50 mA. Considering that the conventional reversal $\Delta\beta$ type optical switch shown in FIG. 12 generally exhibits a through state with an injection current of about 200 mA, the optical functional device of this invention can achieve a switching characteristic in response to a very small injection current.

Figure 17:
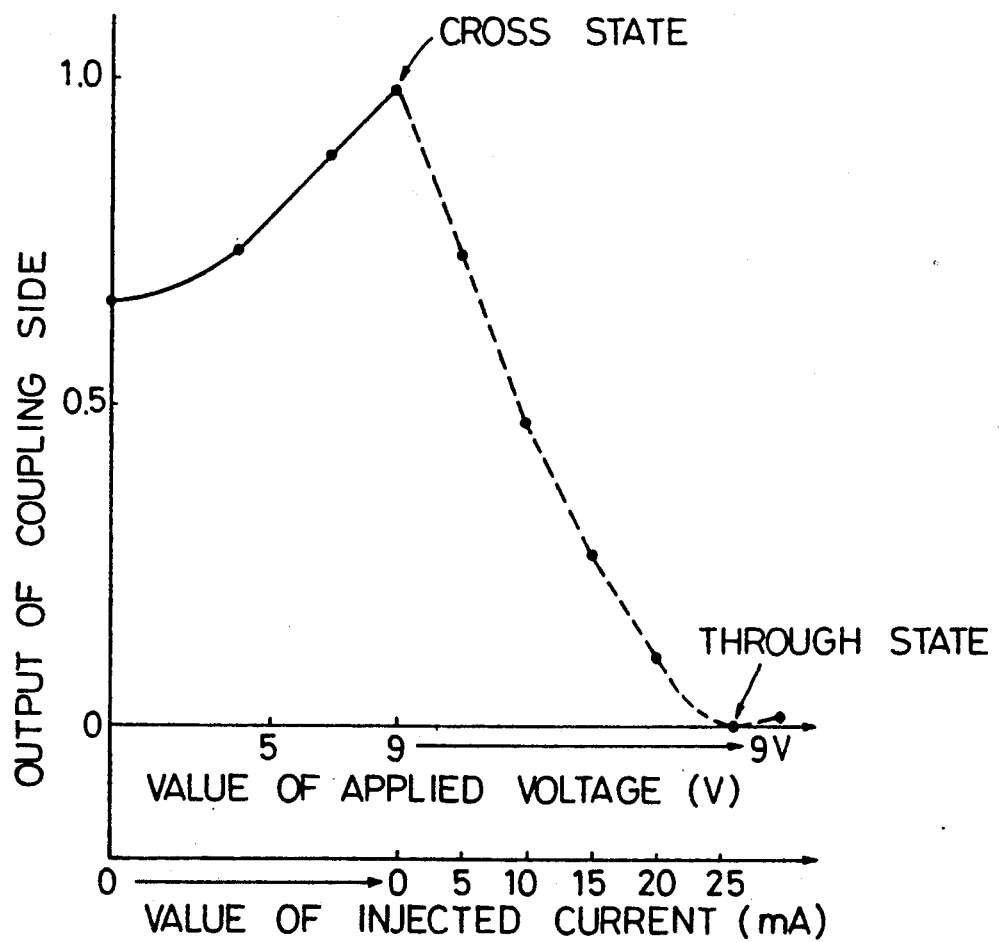
FIG. 17 is a graph showing the operation characteristic of the optical functional device of this invention functioning as an optical switch.

FIG. 17 shows a switching characteristic of an optical functional device obtained when the above-described clad layer 38a is formed with a thickness of 0.6 μm. In this case, a cross state can be set by voltage application of only 9 V and a through state can be set by current injection of only 26 mA.

Figure 18:
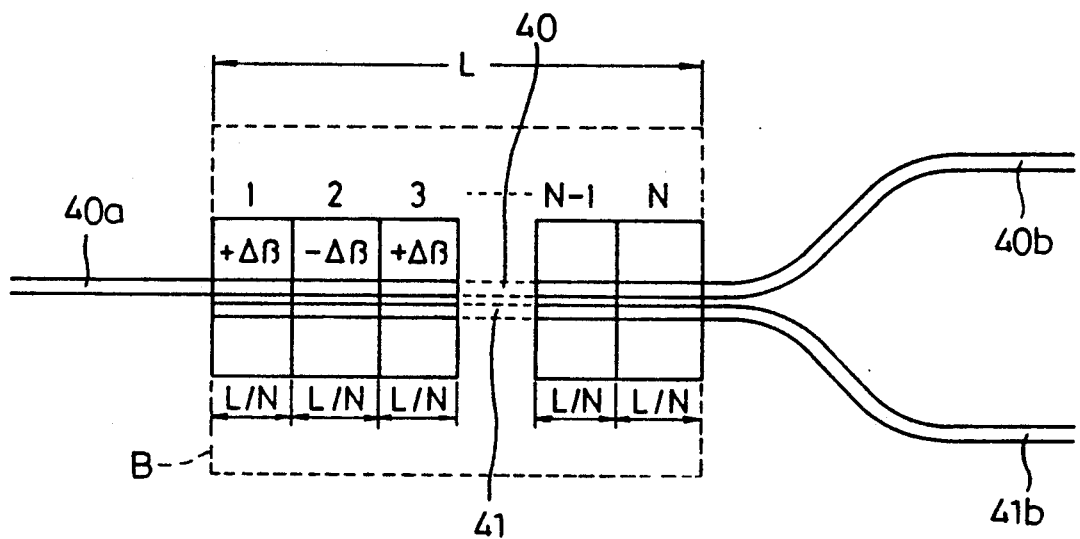
FIG. 18 is a schematic plan view of a 1×2 directional coupler type optical functional device of reversal $\Delta\beta$ structure type according to another aspect of this invention and having N stage electrodes formed thereon.
Figure 19:
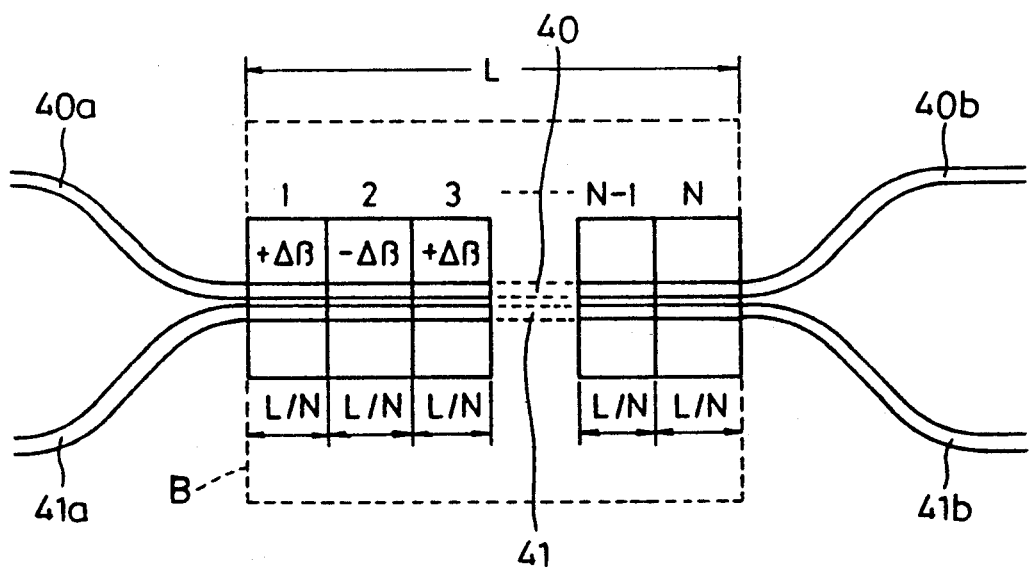
FIG. 19 is a schematic plan view of a 2×2 directional coupler type optical functional device of this invention.

FIGS. 18 and 19 are schematic plan views showing other embodiments of optical functional devices of this invention, the device of FIG. 18 is of one-input/two-output (1×2) directional coupler type and the device of FIG. 19 is of two-input/two-output (2×2) directional coupler type.

In the optical functional devices shown in FIGS. 18 and 19, a first optical waveguide 40 and a second optical waveguide 41, in which a pn junction structure is formed by laminating semiconductor materials, are evanescent-coupled at the coupling portion B with the wavelength of propagated light over a complete coupling length $L_0$ and extend parallel to each other, and the coupling portion B has a total length of L.

In this case, one end 40a of the first optical waveguide 40 and one end 41a of the second optical waveguide 41 are light entering ends and the other end 40b of the first optical waveguide 40 and the other end 41b of the second optical waveguide 41 are light emission ends.

N-stage electrodes are alternately formed with reversal $\Delta\beta$ structures and are continuously disposed in the lengthwise direction of a coupling portion B of a length L with the length of each stage set to L/N. In this case, N is an integer larger than 2, that is, the electrodes are formed with three or more stages. Therefore, if the first-stage electrode is of $+\Delta\beta$ type, the last-stage electrodes is of $+\Delta\beta$ type when n is an odd number, and the last-stage electrode is of $-\Delta\beta$ type when N is an even number.

Figure 20:
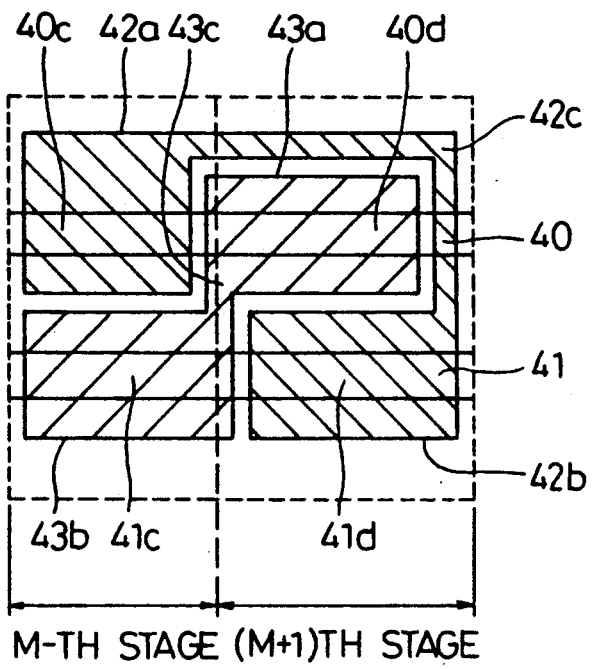
FIG. 20 is a schematic plan view showing the state in which Mth stage and (M+1)th stage electrodes are disposed.

Among the N-stage electrodes, electrodes in the Mth and (M+1)th (M is an integer of 1, 2, ..., or (N−1)) stages are arranged as shown in FIG. 20.

That is, electrodes 42a and 42b are disposed to be electrically connected to each other on an upstream side portion 40c of one of the optical waveguides (which is a first optical waveguide 40 in the drawing) and a downstream side portion 41d of the other optical waveguide (which is a second optical waveguide 41 in the drawing, respectively). Further, electrodes 43a and 43b are disposed to be electrically connected to each other but electrically separated from the electrodes 42a and 42b on a downstream side portion 40d of the first optical waveguide 40 and an upstream side portion 41c of the second optical waveguide 41, respectively.

Among the above electrodes, a combination of the electrodes 42a and 42b constitutes a first electrode specified in this invention and a combination of the electrodes 43a and 43b constitutes a second electrode. The electrodes can be independently used for current injection and voltage application, and for example, when the first electrodes 42a and 42b are used for current injection (or voltage application), the second electrodes 43a and 43b are used for voltage application (or current injection).

When the electrodes are arranged as described above, the $\Delta\beta$ of the optical waveguide is alternated between an area in which the Mth-stage electrode (which is the electrodes 42a and 42b in the drawing) is disposed and an area in which the (M+1)th-stage electrode (which is the electrodes 43a and 43b) is disposed.

Figure 21:
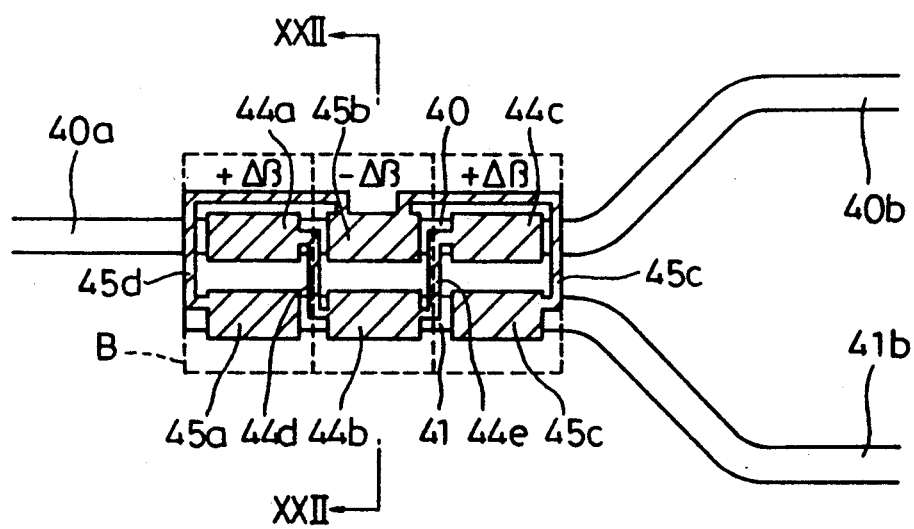
FIG. 21 is a schematic plan view of a 1×2 directional coupler type optical functional device having 3-stage electrodes disposed on the coupling portion.

FIG. 21 shows a 1×2 directional coupler type optical functional device having 3-stage electrodes disposed in the coupling portion B.

In FIG. 21, electrodes 44a, 44b and 44c are electrically connected to each other by means of connecting portions 44d and 44e to constitute a first electrode, and electrodes 45a, 45b and 45c are electrically connected to each other by means of connecting portions 45d and 45e to constitute a second electrode.

Figure 22:
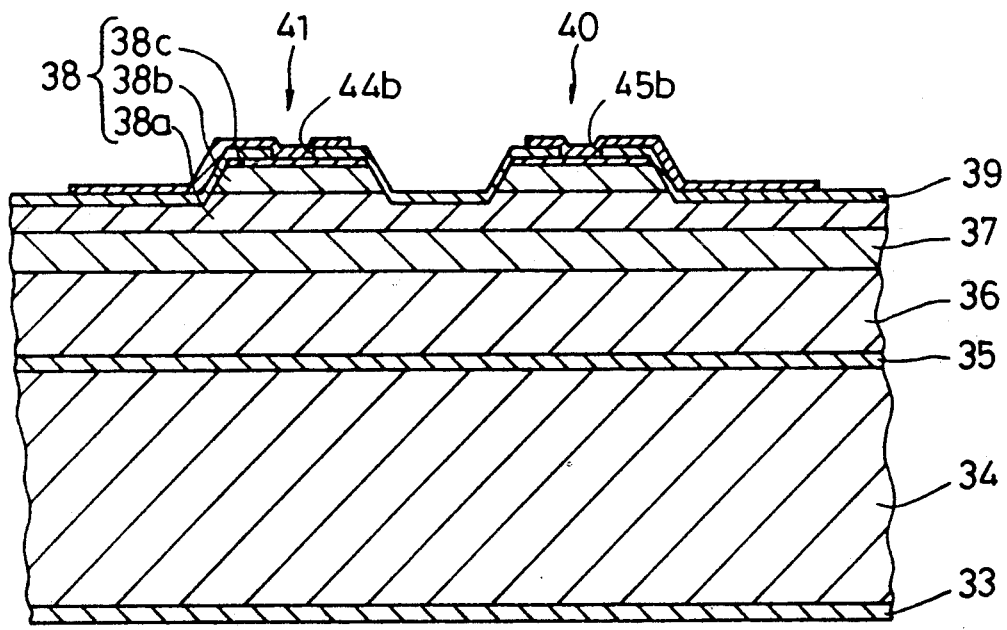
FIG. 22 is a cross sectional view taken along the line XXII—XXII of FIG. 21.

The cross sectional structure of the above device is shown in FIG. 22 which is a cross sectional view taken along the line XXII—XXII of FIG. 21, and the basic construction thereof is the same as that shown in FIG. 14.

Figure 23:
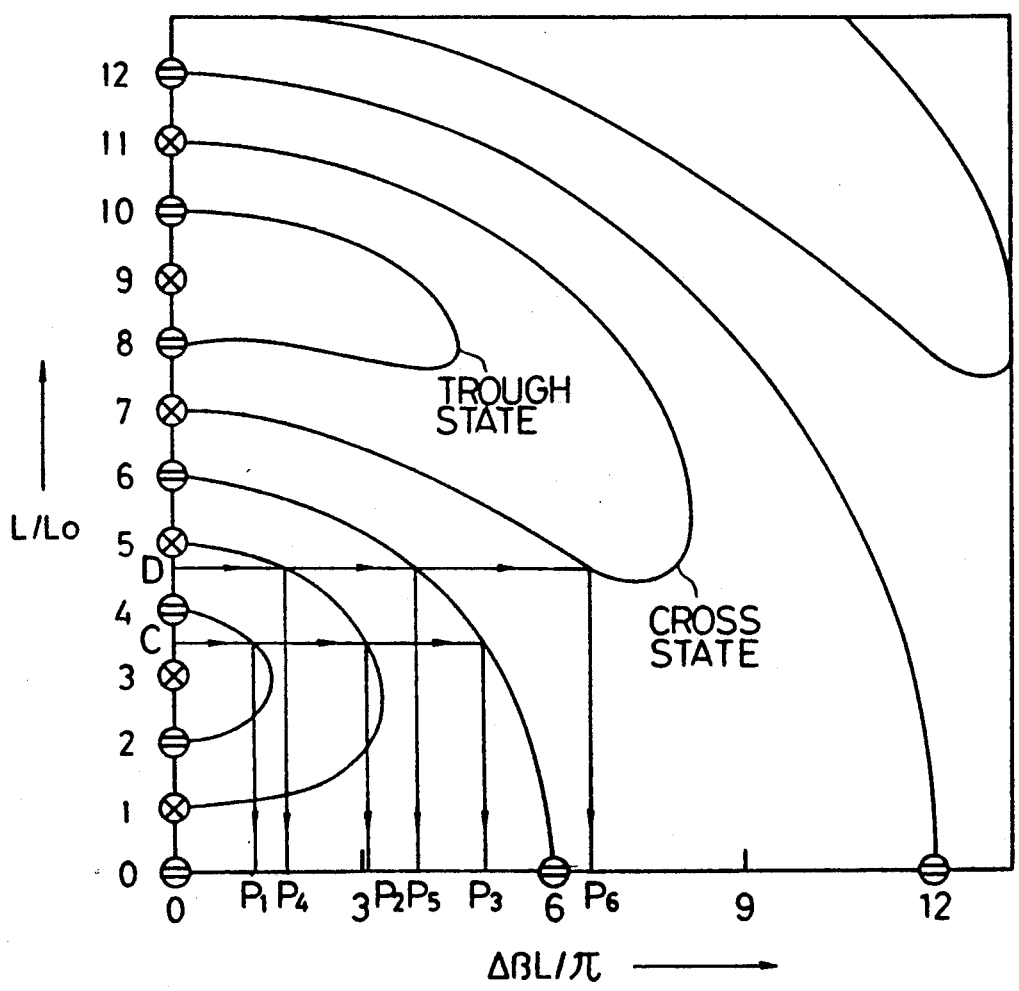
FIG. 23 is a switching characteristic diagram of the optical functional device of FIG. 21.

In the optical functional device in which N=3, $L_0$ is determined in relation to propagating light and the coupling length L is variously changed, a switching characteristic diagram which draws loci as shown in FIG. 23 can be obtained by checking the relation between the $L/L_0$ and $\Delta\beta$. Since, at this time, $\Delta\beta$ varies according to the values of current injected and voltage applied by use of the electrodes, the cross state and through state will vary between the optical waveguides in the coupling portion according to the current and voltage values.

Assume now that an optical functional device in which the value of $L/L_0$ is set to a value corresponding to C in FIG. 23, for example, is formed.

Since a through state is set between the optical waveguides of the coupling portion B when $\Delta\beta L/\pi$ is set to $P_1$ by injecting current of a proper value $I_{1C}$ via the first electrodes 44a, 44b and 44c, both of the TE mode light and TM mode light are emitted from the emission end 40b when light in which both of the TE mode and TM mode are present is made incident on the incident end 40a of FIG. 21.

Since a cross state only for the TE mode is set when voltage of a preset value $V_{1C}$ is applied to the second electrodes 45a, 45b and 45c to set $\Delta\beta L/\pi$ to $P_2$ while the above state is maintained, the TE mode component of light containing TE mode and TM mode entering the incident end 40a is coupled with the second optical waveguide 41 and emitted from the emission end 41b, but the TM mode light is emitted from the emission end 40b. That is, the TE mode and TM mode are split and the device functions as an optical mode splitter.

Since a cross state is set between the optical waveguides of the coupling portion B when $\Delta\beta L/\pi$ is set to $P_2$ by increasing the current injected via the first electrodes 44a, 44b and 44c to $I_{2C}$ ($I_{2C}>I_{1C}$), both of the TE mode light and TM mode light incident on the incident end 40a are coupled with the second optical waveguide 41 and emitted from the emission end 41b. Since the optical waveguide is set into a through state only for the TE mode when voltage of a preset value $V_{1'C}$ is applied to the second electrodes to set $\Delta\beta L/\pi$ to $P_3$ while the above state is maintained, only the optical path of the TE mode light of the TE mode and TM mode coupled with the second optical waveguide 41 is changed to the first optical waveguide 40 and the TE mode light is emitted from the emission end 40b, and in this case, the TM mode is kept coupled with the second optical waveguide 41 and emitted from the emission end 41b.

The emission ends for the TE mode and TM mode which are split by first injection of current $I_{1C}$ and application of voltage $V_{1C}$ are changed. That is, the polarization switching operation can be attained.

In a case of an optical functional device in which the value of $L/L_0$ is set to a value corresponding to D in FIG. 23, since a cross state is set between the optical waveguides of the coupling portion B when $\Delta\beta L/\pi$ is set to $P_4$ by injecting current of a proper value $I_{1D}$ via the first electrodes 44a, 44b and 44c, both of the TE mode light and TM mode light are coupled with the second optical waveguide 41 and emitted from the emission end 41b when light in which both of the TE mode and TM mode are present is made incident on the incident end 40a of FIG. 21.

Since a through state only for the TE mode is set when voltage of a preset value $V_{1D}$ is applied to the second electrodes 45a, 45b and 45c to set $\Delta\beta L/\pi$ to $P_5$ while the above state is maintained, the TE mode component of light containing the TE mode and TM mode and entering the incident end 40a is emitted from the emission end 40b but the TM mode light is kept coupled with the second optical waveguide 41 and emitted from the emission end 41b. That is, the function of an optical mode splitter can be attained.

Since a through state is set between the optical waveguides of the coupling portion B when $\Delta\beta L/\pi$ is set to $P_5$ by increasing the current injected via the first electrodes 44a, 44b and 44c to $I_{2D}$ ($I_{2D}>I_{1D}$), both of the TE mode light and TM mode light incident on the incident end 40a are emitted from the emission end 40b of the first optical waveguide 40. Since a cross state only for the TE mode is set when voltage of a preset value $V_{1'D}$ is applied to the second electrodes 45a, 45b and 45c to set $\Delta\beta L/\pi$ to $P_6$ while the above state is maintained, only the TE mode light of the TE mode light and TM mode light which have propagated in the first optical waveguide 40 is coupled with the second optical waveguide 41 and emitted from the emission end 41b, and the TM mode light is emitted from the emission end 40b.

That is, the emission ends for the split TE mode and TM mode are changed and the polarization switching operation can be attained.

Figure 24:
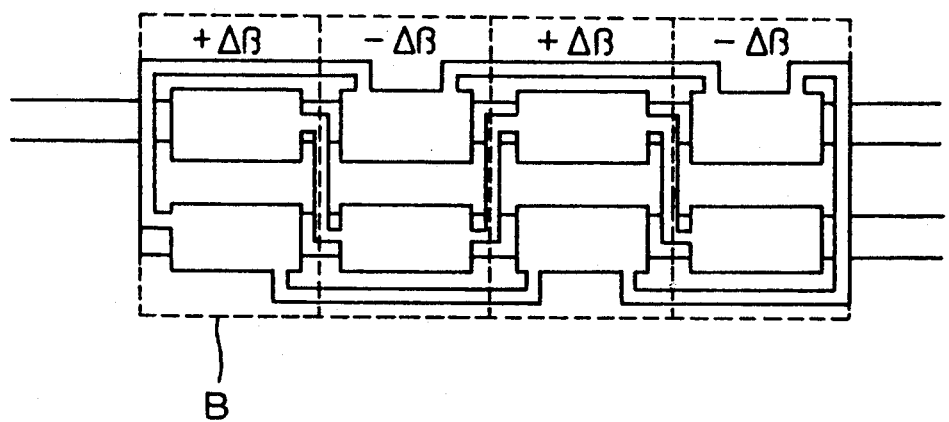
FIG. 24 is a schematic plan view of an optical functional device having 4-stage electrodes disposed on the coupling portion.
Figure 25:
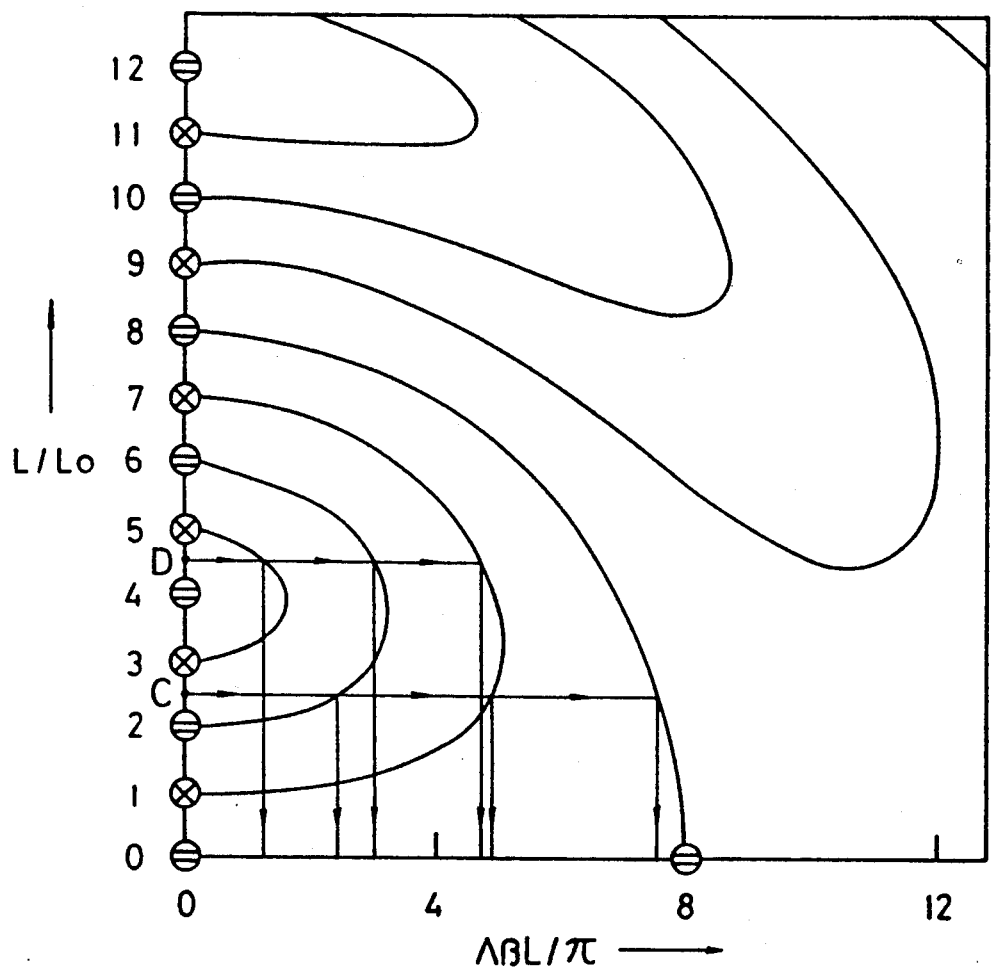
FIG. 25 is a switching characteristic diagram of the optical functional device of FIG. 24.
Figure 26:
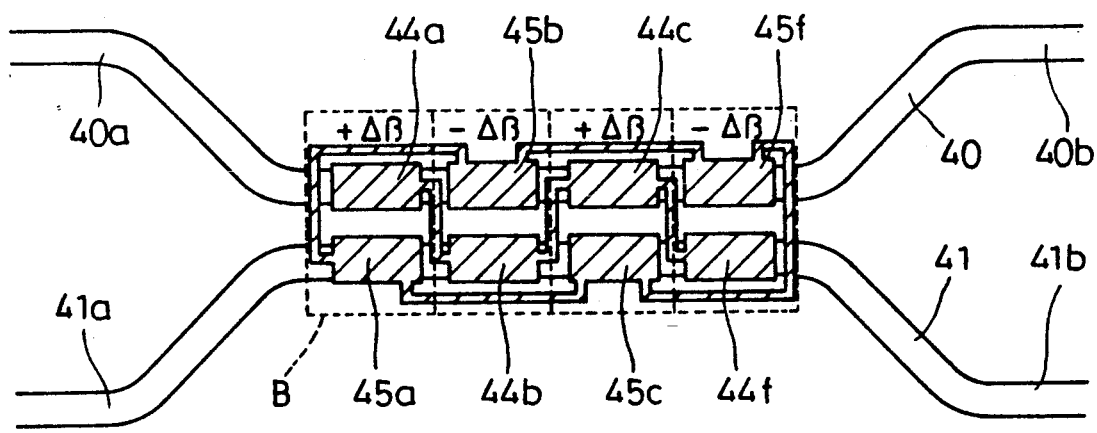
FIG. 26 is a schematic plan view of a 2×2 directional coupler type optical functional device having 4-stage electrodes disposed on the coupling portion.

FIG. 24 is a schematic plan view of an optical functional device having 4-stage electrodes of reversal $\Delta\beta$ structure disposed in the coupling portion B. The relation between values of $L/L_0$ and $\Delta\beta$, that is, the switching characteristics diagram of the device is shown in FIG. 25.

Like the device shown in FIG. 21, the above optical functional device can be operated as an optical mode splitter or polarization optical switch by driving the same in the same manner as described with reference to FIG. 23.

In the 1×2 directional coupler type optical functional device shown in FIGS. 21 and 22, if the length of the coupling portion B is 7.5 mm, $L/L_0$ is approx. 2.8, the lower electrode 33 is formed of AuGeNi/Au, the substrate 34 is formed of n+GaAs, the buffer layer 35 is an n+GaAs layer with a thickness of 0.5 μm, the lower clad layer 36 is an n+Al$_{0.1}$Ga$_{0.9}$As layer with a thickness of 3.0 μm, the core layer 37 is an n−GaAs layer with a thickness of 1.0 μm, the clad 38a is an n−Al$_{0.1}$Ga$_{0.9}$As layer, the clad 38b is a p+Al$_{0.1}$Ga$_{0.9}$As layer, the insulation film 39 is an SiO$_2$ film, and the electrodes 44a, 44b, 44c, 45a, 45b and 45c are vapor deposition layers of Ti/Pt/Au, then the entire light is emitted from the emission end 40b when light in which the TE mode and TM mode are present is made incident on the incident end 40a of the optical functional device and current of 15 mA is injected into the optical waveguides by means of the first electrodes 44a, 44b and 44c.

When a reverse bias voltage of −16 V is applied to the second electrodes 45a, 45b and 45c while maintaining the above state, the TE mode light is emitted from the emission end 41b and the TM mode light is emitted from the emission end 40b and thus the two modes are split, so that the device may function as an optical mode splitter.

The entire light is emitted from the emission end 41b by increasing the injection current via the first electrode to approx. 33 mA. When a revere bias voltage of −18 V is applied to the second electrode while maintaining the above state, the TE mode light is emitted from the emission end 40b and the TM mode light is emitted from the emission end 41b as it is.

That is, the optical functional device can be operated as a polarization switch by changing the driving condition from the state in which the current is 15 mA and the reverse voltage is −16 V to the state in which the current is 33 mA and the reverse voltage is −18 V.

The extinction ratio of the optical functional device is approx. 30 dB.

In the case of the optical functional device in which the 4-stage electrodes are disposed in the coupling portion B as shown in FIG. 23, the specification of the cross sectional structure is the same as that shown in FIG. 22, the length of the coupling portion B is approx. 8.8 mm, and $L/L_0$ is set to approx. 3.3, the entire light is emitted from the emission end 41b when light in which the TE mode and TM mode are present is made incident on the incident end 40a of the device and current of approx. 11 mA is injected into the optical waveguide via the first electrodes 44a, 44b, 44c and 44d.

When a reverse bias voltage of −17 V is applied to the second electrodes 45a, 45b, 45c and 45d while maintaining the above state, The TE mode light is emitted from the emission end 40b and the TM mode light is emitted from the emission end 41b and thus the two modes are split so that the device can be operated as an optical mode splitter.

When the current injected via the first electrodes is increased to approx. 29 mA, the entire light is emitted from the emission end 40b. When a reverse bias voltage of −15 V is applied to the second electrodes while maintaining the above state, the TE mode light is emitted from the emission end 41b. The extinction ratio obtained at this time is approx. 30 dB.

That is, the optical functional device can be operated as a polarization switch by changing the driving condition from the state in which the current is 11 mA and the reverse voltage is −17 V to the state in which the current is 29 mA and the reverse voltage is −15 V.

What is claimed is:

1. A directional coupler type optical functional device having first and second optical waveguides in which pn junction structures are formed by laminating semiconductor material, and a coupling portion in which said two optical waveguides are evanescent-coupled to each other and arranged in parallel, comprising:
    voltage application electrodes formed on an upstream side portion of said first optical waveguide and a downstream side portion of said second optical waveguide in said coupling portion;
    said voltage application electrodes being electrically connected to each other;
    current injection electrodes formed on a downstream side portion of said first optical waveguide and an upstream side portion of said second optical waveguide in said coupling portion; and
    said current injection electrodes being electrically connected to each other and electrically isolated from said voltage application electrodes.

2. An optical functional device having first and second optical waveguides in which pn junction structures are formed by laminating semiconductor material, and a coupling portion in which said two optical waveguides are evanescent-coupled to each other over a complete coupling length $L_0$ and arranged in parallel and said coupling portion having a length of L, comprising:
    N-stage paired electrodes, where N is an integer larger than 2, said N stage paired electrodes being of reversal $\Delta\beta$ structure type and continuously disposed in a light propagating direction in said optical waveguides on each of said optical waveguides in said coupling portion; and wherein:
    an Mth stage electrode of said N-stage paired electrodes, where M is an integer which satisfies the relation $1 \leq M \leq N-1$, formed on said first optical waveguide and an (M+1)th stage electrode formed on said second optical waveguide are electrically connected to each other to form a first electrode;
    an Mth stage electrode of said N-stage paired electrodes formed on said second optical waveguide and an (M+1)th stage electrode formed on said first optical waveguide are electrically connected to each other to form a second electrode; and
    said first and second electrodes are electrically isolated from each other.

3. A method for driving a directional coupler type optical functional device having first and second optical waveguides in which pn junction structures are formed by laminating semiconductor material, and a coupling portion in which said optical waveguides are evanescent-coupled to each other and arranged in parallel, wherein:
    voltage application electrodes are formed on an upstream side portion of said first optical waveguide and a downstream side portion of said second optical waveguide in said coupling portion;
    said voltage application electrodes being electrically connected to each other;
    current injection electrodes are formed on a downstream side portion of said first optical waveguide and an upstream side portion of said second optical waveguide in said coupling portion; and
    said current injection electrodes being electrically connected to each other and electrically isolated from said voltage application electrodes;
    the method comprising:
    causing incident light including TE mode light and TM mode light to enter one of said first and second optical waveguides;
    injecting current of a predetermined value into said optical waveguides via said current injection electrodes to establish a cross state between said optical waveguides in said coupling portion; and
    applying a present voltage to said voltage application electrodes while maintaining said cross state so as to establish a through state only for the TE mode light between said optical waveguides in said coupling portion, thereby splitting the incident light into the TE mode light and the TM mode light.

4. A method for driving a directional coupler type optical functional device having first and second optical waveguides in which pn junction structures are formed by laminating semiconductor material, and a coupling portion in which said optical waveguides are evanescent-coupled to each other and arranged in parallel, wherein:
    voltage application electrodes are formed on an upstream side portion of said first optical waveguide and a downstream side portion of said second optical waveguide in said coupling portion;
    said voltage application electrodes being electrically connected to each other;
    current injection electrodes are formed on a downstream side portion of said first optical waveguide and an upstream side portion of said second optical waveguide in said coupling portion; and
    said current injection electrodes being electrically connected to each other and electrically isolated from said voltage application electrodes;
    the method comprising:
    causing TE mode light to enter one of said first and second optical waveguides;
    applying a voltage of a preset value to said voltage application electrodes so as to establish a cross state between said optical waveguides in said coupling portion; and
    injecting current of a predetermined value into said optical waveguides via said current injection electrodes while maintaining said cross state so as to establish a through state between said optical waveguides in said coupling portion, thereby changing an optical path of the incident TE mode light.

5. In a method of driving an optical functional device having first and second optical waveguides in which pn junction structures are formed by laminating semiconductor material, and a coupling portion in which said two optical waveguides are evanescent-coupled to each other over a complete coupling length $L_o$, and arranged in parallel, and said coupling portion having a length of L, and wherein:

N-stage paired electrodes, where N is an integer larger than 2, said N stage paired electrodes being of a reversal $\Delta\beta$ structure type and continuously disposed in a light propagating direction in said optical waveguides on each of said optical waveguides in said coupling portion; and wherein:

an Mth stage elecrode of said N-stage paired electrodes, where M is an integer which satisfies the relation that $1 \leq M \leq N-1$, formed on said first optical waveguide and an (M+1)th stage electrode formed on said second optical waveguide are electrically connected to each other to form a first electrode;

an Mth stage electrode of said N-stage paired electrode formed on said second optical waveguide and an (M+1)th stage electrode formed on said first optical waveguide are electrically connected to each other to form a second electrode;

said first and second electrodes are electrically isolated from each other, and wherein $L/L_o$ is set to a predetermined value;

the method comprising:

causing incident light including TE mode light and TM mode light to enter one of said first and second optical waveguides;

injecting current of a preset value into said optical waveguides via said first electrode so as to establish one of a cross state and a through state between said optical waveguides in said coupling portion; and applying voltage of a preset value to said second electrode while maintaining said one of the cross state and the through state so as to set the one of the cross state and the through state only for the TE mode between said optical waveguides in said coupling portion, thereby splitting the incident light into the TE mode light and the TM mode light.

6. In a method of driving an optical functional device having first and second optical waveguides in which pn junction structures are formed by laminating semiconductor material, and a coupling portion in which said optical waveguides are evanescent-coupled to each other over a complete coupling length $L_o$, and arranged in parallel, and said coupling portion having a length of L, and wherein:

N-stage paired electrodes where N is an integer larger than 2, said N stage paired electrodes being of reversal $\Delta\beta$ structure type and continuously disposed in a light propagating direction in said optical waveguides on each of said optical waveguides in said coupling portion; and wherein:

an Mth stage electrode where M is an integer which satisfies the relation that $1 \leq M \leq N-1$, formed on said first optical waveguide and an (M+1)th stage electrode formed on said second optical waveguide are electrically connected to each other to form a first electrode;

an Mth stage electrode formed on said second optical waveguide and an (M+1)th stage electrode formed on said first optical waveguide are electrically connected to each other to form a second electrode;

said first and second electrodes are electrically isolated from each other, and wherein $L/L_o$ is set to a predetermined value;

the method comprising:

causing incident light including TE mode light and TM mode light to enter one of said first and second optical waveguides;

injecting current of a first present value into said optical waveguides via said first electrode so as to establish one of a cross state and a through state between said optical waveguides in said coupling portion;

applying voltage of a preset value to said second electrode while maintaining said one of the cross state and the through state so as to set the one of the cross state and through state only for the TE mode between said optical waveguides in said coupling portion, thereby splitting the incident light into the TE mode light and TM mode light;

injecting current of a second preset value which is larger than the first preset value into said optical waveguides via said first electrode so as to establish the one of the cross state and the through state between said optical waveguides in said coupling portion; and applying voltage of a preset value to said second electrode while maintaining said one of the cross state and the through state so as to set the one of the through state and the cross state only for the TE mode between said optical waveguides in said coupling portion, thereby changing a path of the split TE mode light and TM mode light.

* * * * *